US009626194B2

(12) United States Patent
Burns et al.

(10) Patent No.: US 9,626,194 B2
(45) Date of Patent: Apr. 18, 2017

(54) THREAD LIVELOCK UNIT

(71) Applicant: Intel Corporation, Santa Clara, CA (US)

(72) Inventors: David W. Burns, Portland, OR (US); K. S. Venkatraman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 13/625,264

(22) Filed: Sep. 24, 2012

(65) Prior Publication Data

US 2014/0089931 A1   Mar. 27, 2014
US 2017/0023994 A9   Jan. 26, 2017

Related U.S. Application Data

(60) Division of application No. 12/783,469, filed on May 19, 2010, now Pat. No. 8,276,149, which is a continuation of application No. 10/948,878, filed on Sep. 23, 2004, now Pat. No. 7,748,001.

(51) Int. Cl.
G06F 9/46   (2006.01)
G06F 9/38   (2006.01)

(52) U.S. Cl.
CPC .......... *G06F 9/3857* (2013.01); *G06F 9/3851* (2013.01)

(58) Field of Classification Search
None
See application file for complete search history.

(56) References Cited

U.S. PATENT DOCUMENTS

| | | | |
|---|---|---|---|
| 6,085,300 A | 7/2000 | Sunaga et al. |
| 6,212,544 B1 | 4/2001 | Borkenhagen et al. |
| 6,343,352 B1 | 1/2002 | Davis et al. |
| 6,542,921 B1 | 4/2003 | Sager |
| 6,543,002 B1 | 4/2003 | Kahle et al. |
| 6,587,894 B1 | 7/2003 | Stracovsky et al. |
| 6,651,158 B2 | 11/2003 | Burns et al. |
| 6,658,447 B2 | 12/2003 | Cota-Robles |
| 6,968,431 B2 | 11/2005 | Mayfield |
| 7,065,596 B2 | 6/2006 | Kulick et al. |
| 7,434,033 B2 | 10/2008 | Abernathy et al. |
| 7,437,539 B2 | 10/2008 | Abernathy et al. |

(Continued)

FOREIGN PATENT DOCUMENTS

WO   WO2006034288 A2   3/2006

OTHER PUBLICATIONS

International Application No. PCT/US2005/033699, PCT International Search Report and Written Opinion, Sep. 19, 2006, 16 pages.

(Continued)

*Primary Examiner* — Dong Kim
(74) *Attorney, Agent, or Firm* — Nicholson De Vos Webster & Elliot, LLP

(57) ABSTRACT

Method, apparatus, and system embodiments to assign priority to a thread when the thread is otherwise unable to proceed with instruction retirement. For at least one embodiment, the thread is one of a plurality of active threads in a multiprocessor system that includes memory livelock breaker logic and/or starvation avoidance logic. Other embodiments are also described and claimed.

5 Claims, 9 Drawing Sheets

(56) References Cited

U.S. PATENT DOCUMENTS

| | | | |
|---|---|---|---|
| 7,454,600 B2 | 11/2008 | Burns et al. | |
| 2002/0042856 A1 | 4/2002 | Hartwell et al. | |
| 2002/0087840 A1 | 7/2002 | Kottapalli et al. | |
| 2002/0199088 A1 | 12/2002 | Burns et al. | |
| 2002/0199089 A1* | 12/2002 | Burns | G06F 9/4881 712/228 |
| 2003/0023658 A1 | 1/2003 | Kalafatis et al. | |
| 2003/0088610 A1 | 5/2003 | Kohn et al. | |
| 2003/0154235 A1 | 8/2003 | Sager | |
| 2003/0158885 A1 | 8/2003 | Sager | |
| 2003/0196141 A1 | 10/2003 | Shaw | |
| 2003/0233394 A1* | 12/2003 | Rudd | G06F 9/3851 718/107 |
| 2004/0068597 A1 | 4/2004 | Kulick et al. | |
| 2004/0078794 A1 | 4/2004 | Burns et al. | |
| 2004/0216103 A1 | 10/2004 | Burky et al. | |
| 2004/0216106 A1 | 10/2004 | Kalla et al. | |
| 2006/0031844 A1* | 2/2006 | Dice | G06F 9/52 718/106 |
| 2006/0064695 A1* | 3/2006 | Burns et al. | 718/100 |
| 2006/0136915 A1* | 6/2006 | Aingaran | G06F 9/3842 718/100 |

OTHER PUBLICATIONS

International Application No. PCT/US2005/033699, PCT International Preliminary Report on Patentability, Apr. 5, 2007, 12 pages.

* cited by examiner

THREAD LIVELOCK UNIT

The present patent application is a Divisional of U.S. patent application Ser. No. 12/783,469, filed May 19, 2010, now U.S. Pat. No. 8,276,149, which is a Continuation of U.S. patent application Ser. No. 10/948,878, filed Sep. 23, 2004, now U.S. Pat. No. 7,748,001.

TECHNICAL FIELD

The present disclosure relates generally to information processing systems and, more specifically, to detecting and correcting livelock among a plurality of concurrent threads in a multi-threaded processing system.

BACKGROUND

In order to increase performance of information processing systems, such as those that include microprocessors, both hardware and software techniques have been employed. On the hardware side, microprocessor design approaches to improve microprocessor performance have included increased clock speeds, pipelining, branch prediction, super-scalar execution, out-of-order execution, and caches. Many such approaches have led to increased transistor count, and have even, in some instances, resulted in transistor count increasing at a rate greater than the rate of improved performance.

Rather than seek to increase performance strictly through additional transistors, other performance enhancements involve software techniques. One software approach that has been employed to improve processor performance is known as "multithreading." In software multithreading, an instruction stream may be divided into multiple instruction streams that can be executed in parallel. Alternatively, multiple independent software streams may be executed in parallel.

In one approach, known as time-slice multithreading or time-multiplex ("TMUX") multithreading, a single processor switches between threads after a fixed period of time. In still another approach, a single processor switches between threads upon occurrence of a trigger event, such as a long latency cache miss. In this latter approach, known as switch-on-event multithreading ("SoEMT"), only one thread, at most, is active at a given time.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

For a system that supports concurrent execution of software threads, such as SMT and/or CMP systems, there exists the possibility that contention for shared resources among two or more concurrent active threads may prevent at least one of the threads from making forward progress. This inability of a thread to make forward progress due to resource contention with another active thread may be referred to as "livelock."

BRIEF DESCRIPTION OF THE DRAWINGS

Embodiments of the present invention may be understood with reference to the following drawings in which like elements are indicated by like numbers. These drawings are not intended to be limiting but are instead provided to illustrate selected embodiments of an apparatus, system and method to detect and correct livelock among a plurality of concurrent threads in a multi-threaded processing system.

DETAILED DESCRIPTION

In the following description, numerous specific details such as processor types, multithreading environments, and microarchitectural structures have been set forth to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Method, apparatus and system embodiments disclosed herein provide for detection and avoidance of livelock in a multithreaded processing system. For at least one disclosed embodiment, thread livelock units include a mechanism to track retirement of instructions of a software thread for a logical processor. Tracking retirement is just one approach for tracking whether a thread is making forward progress. Although embodiments discussed herein focus on retirement of instructions as an indicator of forward progress, one of skill in the art will recognize that other embodiments may utilize a different, or additional, indicators to determine whether a thread is making forward progress. For example, a thread progress signal or register may be evaluated, advancement of the instruction pointer may be tracked, or any other progress-indicating signals or indicators may be evaluated.

Figure 1:
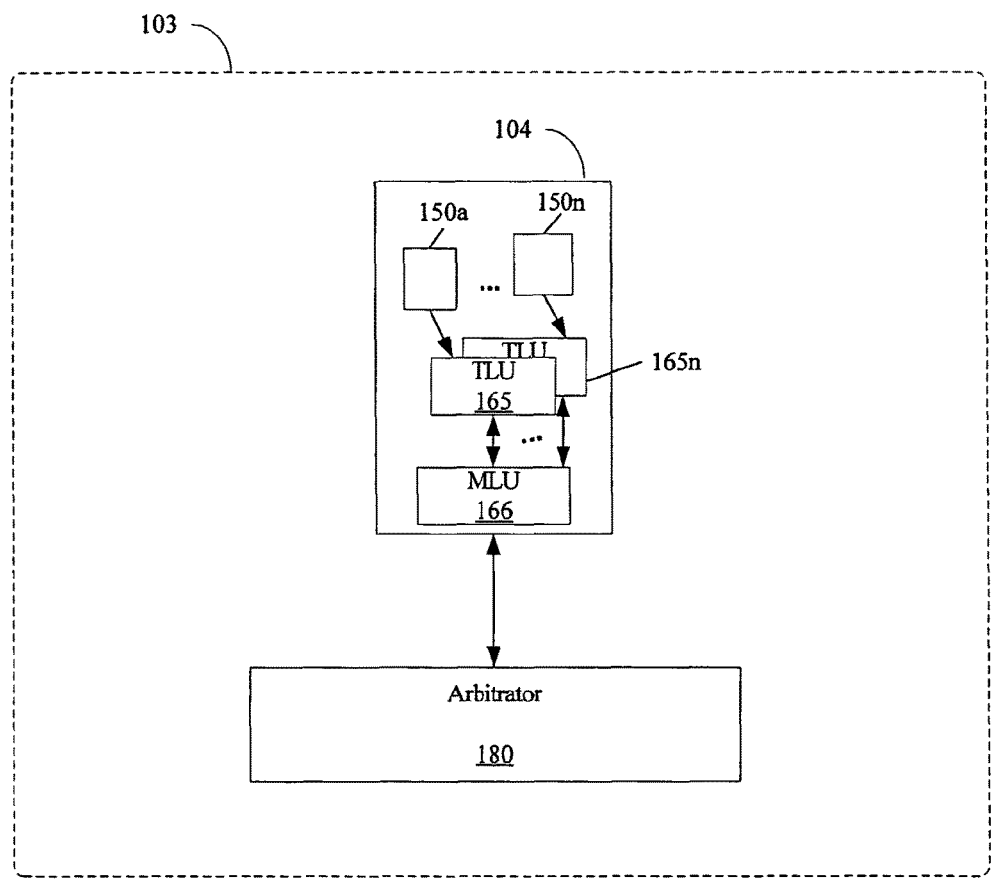
FIG. 1 is a block diagram of at least one embodiment of a processor that includes a plurality of thread livelock units, each to determine forward thread progress for one of a plurality of logical processors.

FIG. 1 illustrates at least one embodiment of a processor 104 and an arbitrator 180 to perform multithreading. The processor 104 and the arbitrator 180 may reside in a single chip package 103. The processor 104 may include multiple logical processors 150a-150n to support concurrent multi-threading. For at least one embodiment, processor 104 utilizes its multiple logical processors 150a-150n to provide SMT processing capability. For such embodiments, each logical processor 150a-150n has its own instruction sequencer (see, for example, 340, FIG. 3). For such embodiment, the logical processor 150 maintains its own version of the architecture state, although execution resources of the single processor core 104 may be shared among all concurrent SMT software threads.

For SMT, a plurality of multiple software threads may run concurrently, each on one of a plurality of logical processors 150. The logical processors 150a-150n may also be interchangeably referred to herein as "physical threads." Unless otherwise specifically noted, the term "thread" as used herein, when not prefaced with "physical" or "software", is meant to collectively refer to an active logical processor and the associated software instruction stream that the logical processor is executing.

FIG. 1 illustrates that a thread livelock unit ("TLU") 165-165n may be associated with each of the logical processors 150a-150n. For at least one embodiment, the TLU 165 is thus replicated on a per-thread basis for each physical thread 150a-150n of the processor 104. The TLU 165 for a particular physical thread 150 may sometimes be referred to herein simply as the physical thread's "TLU."

FIG. 1 illustrates that the processor 104 may also include a memory livelock unit ("MLU") 166. A memory livelock unit 166 may 1) detect livelock among memory operations from concurrent threads for a single processor 104 based on memory livelock indicators, and 2) may take action to resolve such livelock.

The operation of the TLU 165 is discussed in greater detail below in connection with FIGS. 5 through 7. Generally, a thread livelock unit 165 may 1) determine, based on certain thread livelock indicators, that the software thread for its associated logical processor is failing to make forward progress ("live-locked"), and 2) may take action to resolve such livelock. For at least one embodiment, the thread livelock unit 165 determines a lack of forward progress by counting the number of cycles since its logical processor has retired an instruction or has otherwise demonstrated potential forward progress. One particular condition, among others, that the thread livelock unit 165 may detect is referred to as "instruction starvation." Instruction starvation is a condition wherein a first thread may block or unduly delay instruction fetching for another other thread. As a result, we say that the other thread is "instruction starved" or I-starved. A thread experiencing instruction starvation is experiencing an absence of available instructions for execution—it cannot make forward progress because it has no instructions to retire.

When a thread livelock unit 165 takes action in an attempt to resolve a livelock, the thread livelock unit 165 is referred to herein as "active." A thread livelock unit 165 may become "active" to perform any of several livelock breaker actions, which are undertaken in an attempt to stimulate forward progress of the thread with which the TLU 165 is associated. For example, a first logical processor's 150 TLU 165 may take action to request that one or more other logical processors 150 be stalled, or that the microarchitectural state for one or more other logical processors 150 be reset (sometimes referred to herein as "nuked"), in response to inability of its associated logical processor 150 to make forward progress. Also, for example, an active TLU 165 may invoke a livelock breaker (see, for example, discussion of shared livelock breaker 950 in connection with FIG. 9, below) to take actions to alleviate instruction starvation. Also, an active TLU 165 may request priority from the arbitrator 180 if a long-latency cache miss is detected. Some embodiments that take such actions are discussed in further detail below, in connection with FIGS. 5-7.

Thus, according to one embodiment, the TLU's 165-165n, along with the arbitrator 180, enforce a priority among the logical processors 150a-150n and the MLU 166 for a processor 104 in order to detect and alleviate livelock conditions during execution of SMT software threads. In addition, the TLU's 165-165n may themselves enforce a priority among the logical processors 150a-150n in order to detect and alleviate certain livelock conditions. Finally, for a multi-core processing system, the arbitrator 180 may also enforce a priority among multiple cores in order to alleviate thread livelock. However, in various different embodiments, some or all of these features may or may not be present.

Figure 2:
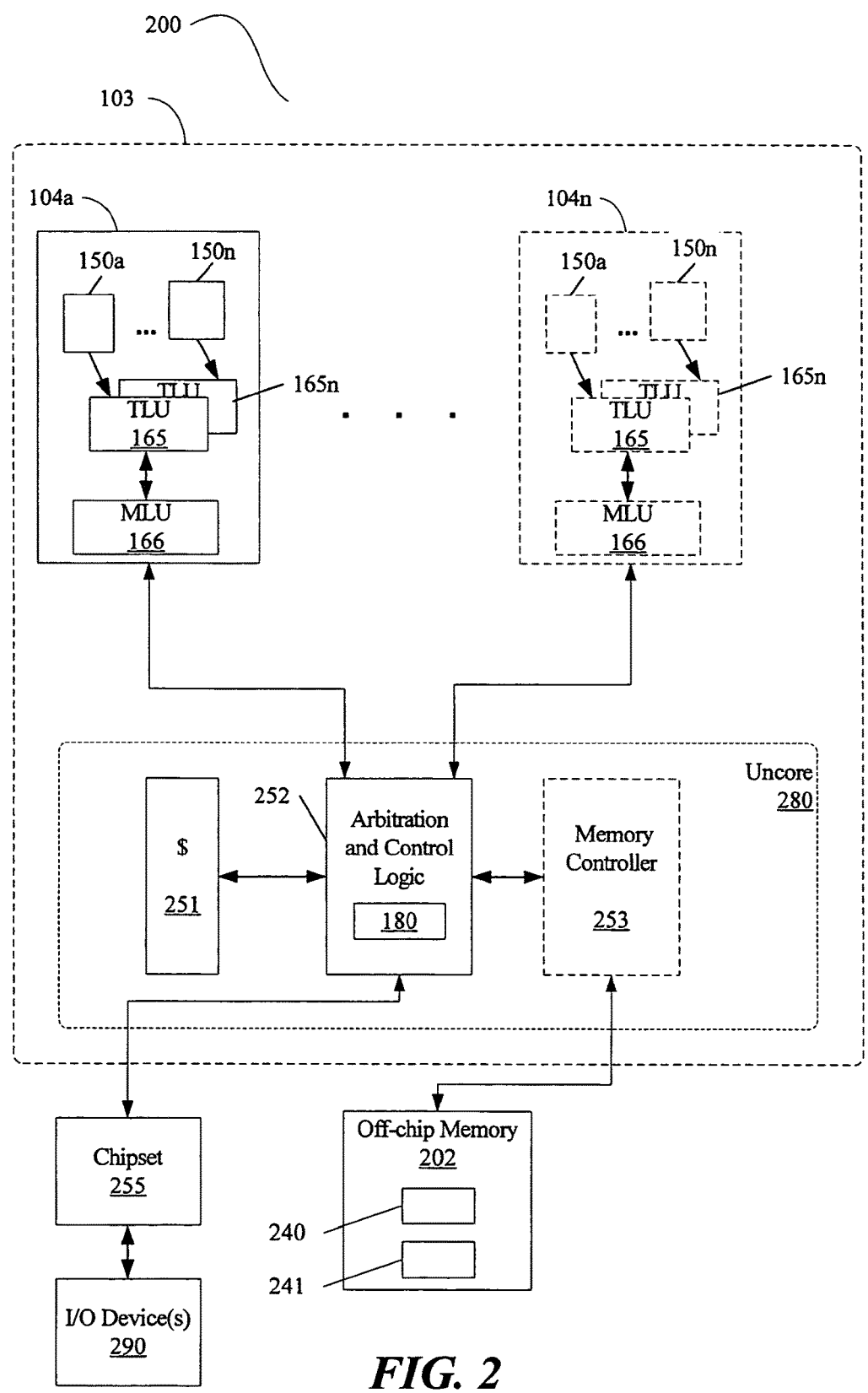
FIG. 2 is a block diagram illustrating at least one embodiment of a multithreading system capable of performing disclosed techniques.

FIG. 2 is a block diagram illustrating at least one embodiment of a multi-core multithreaded computing system 200 capable of performing the disclosed techniques to detect and alleviate livelock among a plurality of concurrent threads. Like elements in FIGS. 1 and 2 bear like reference numerals FIG. 2 illustrates that the computing system 200 includes at least one processor core 104a and a memory 202. Memory 202 may store data 240 and instructions 241 for controlling the operation of the processors 104a-104n. For at least one embodiment, the processor 104a may be one of a plurality of processor cores 104a-104n residing in a single chip package 103. The additional processors, including 104n, are optional. The optional nature of the additional processors is denoted by ellipses and broken lines in FIG. 2.

FIG. 2 illustrates that, in addition to the processing cores 104a-104n, additional logic 280 may reside on the chip package 103. Such additional logic 280 is sometimes referred to herein as the "uncore." The additional logic 280 may include one or more of a cache 251 and arbitration and control logic 252. The cache 251 may be a last-level shared unified data and instruction cache that is shared among the processors 104a-104n. The arbitration and control logic 252 may include a point-to-point communications controller, a global communications queue, and/or arbitration logic 180 (see FIG. 1).

The additional logic 280 may also optionally include an integrated memory controller 253. The integrated memory controller 253 may provide an interface to the off-chip memory 202. For such embodiments, a chipset 255 primarily supports graphics-related functionality. The chipset 255 may also provide connectivity with one or more input/output (I/O) devices 290. For at least one embodiment, chipset 255 may include one or more chipset devices, with each chipset device providing separate interface functionality. For example, one of the chipset devices may support graphics functionality while another chipset device may support I/O connectivity and/or interface with a firmware hub (not shown).

For embodiments that do not include an integrated memory controller 253 in the chip package 103, the chipset 255 may provide an interface to the off-chip memory 202. For such embodiments, the chipset 255 may also provide, in addition to memory control functionality, the graphics, I/O and/or firmware functionality described above.

Although embodiments of the system 200 are discussed herein as having a point-to-point communications controller as part of the arbitration and control logic 252, such controller is not required for all embodiments. Indeed, one of the skill in the art will recognize that embodiments of the livelock detection and correction mechanism discussed herein may be performed in a system that employs a multi-drop bus or other communications topology.

FIG. 2 illustrates that, as is shown in FIG. 1, at least one embodiment of the one or more processor cores 104a-104n of the system 200 may be a multithreading core that includes a TLU 165 for each logical processor 150a-150n, and also includes a memory livelock unit 166.

For an embodiment of a processing system 200 that includes a plurality of processor cores 104a-104n, a TLU for one of the physical processors 150a-150n on a processor core 104a-104n may signal the arbitration logic 180 if it has taken corrective action but its associated physical thread 150 still unable to achieve forward progress in the execution of instructions for its associated software thread. In such cases, it may be that actions of another processor core 104 are interfering with the first processor core's 104a ability to make forward progress. As is explained in further detail below, the arbitration logic 180 may grant priority to the requesting core 104 and/or may take action to "nuke" the other cores.

Accordingly, the TLU's 165-165n for each processor core 104, along with the MLU's 166 for each core, and the arbitrator 180 may together form a coordinated livelock reducer. The livelock reducer may thus include a livelock circuit for each core 104, where the livelock circuit may include the TLU's 165-165n and the MLU 166 for the core. As is described in further detail, below, the livelock reducer may receive thread progress information about a thread from a first processor 104a core and may adjust activity of a thread of a second processor core 104n in response to the thread progress information about the first thread from the first processor core 104a.

As is explained in further detail below, at least one embodiment of the processor 104 may be designed to invoke action logic of the MLU 166 in response to detection, by a TLU 165, that a physical thread 150 is unable to make forward progress for its current instruction stream. MLU 166 logic may be invoked, for example, if a TLU 165 takes action to alleviate instruction side (I-side) starvation. (See discussion, below, of state 604 of FIG. 6).

Figure 3:
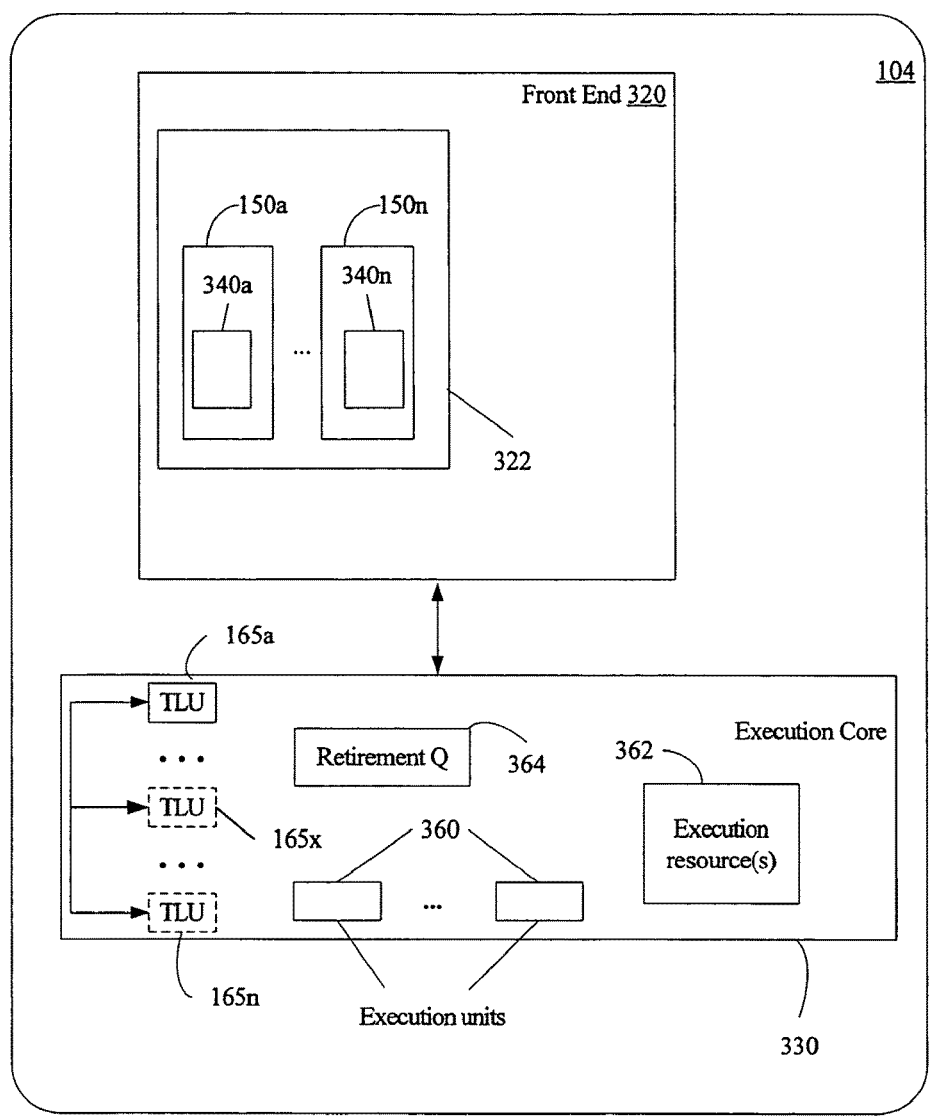
FIG. 3 is a block diagram illustrating a front end and an execution core for at least one embodiment of a processor that includes a thread livelock unit for each of a plurality of logical processors.

FIG. 3 is a block diagram illustrating further details for at least one embodiment of a processor 104 capable of performing disclosed techniques to detect and alleviate livelock conditions among a plurality of concurrent threads. The processor 104 may include a front end 320 that prefetches instructions that are likely to be executed.

For at least one embodiment, the front end 320 includes a fetch/decode unit 322 that includes logically independent sequencers 340a-340n for each of one or more logical processors 150a-150n. The fetch decode unit 322 may fetch appropriate instructions from an instruction cache (see, for example, I-cache 444 in FIG. 4). The fetch/decode unit 322 may also include decode logic that decodes the instructions into a final or intermediate format.

The physical fetch/decode unit 322 thus includes a plurality of logically independent sequencers 340a-340n, each corresponding to a physical thread 150. The sequencer 340 for a physical thread 150 determines the next instruction of the associated software instruction stream (also referred to herein as a "software thread") to be executed by the physical thread 150. The sequencers 340a-340n may utilize information from a branch predictor (see 432, FIG. 4) to determine which instruction is next to be executed.

FIG. 3 illustrates that at least one embodiment of processor 104 includes an execution core 330 that prepares instructions for execution, executes the instructions, and retires the executed instructions. The execution core 330 may include out-of-order logic to schedule the instructions for out-of-order execution. The execution core 330 may include one or more resources 362 that it utilizes to smooth and re-order the flow of instructions as they flow through the execution pipeline and are scheduled for execution. These resources 362 may include one or more of a an instruction queue to maintain unscheduled instructions, memory ordering buffer, load request buffers to maintain entries for uncompleted load instructions, store request buffers to maintain entries for uncompleted store instructions, MLU (see 166, FIG. 1), and the like.

The execution core 330 may include retirement logic that reorders the instructions, executed in an out-of-order manner, back to the original program order. Such retirement logic may include at least one retirement queue 364 to maintain information for instructions in the execution pipeline until such instructions are retired. For at least one embodiment, the retirement queue 364 may be partitioned among the logical processors 150a-150n, such that a portion of the retirement queue is allocated to each logical processor 150a-150n. Alternatively, a separate retirement queue 364 may be utilized for each logical processor 150a-150n.

The retirement logic may receive the completion status of the executed instructions from execution units 360 and may process the results so that the proper architectural state is committed (or retired) according to the program order. The retirement logic may also include thread livelock units 165a-165n. For at least one embodiment, the processor 104 includes separate TLU's 165a-165n for each logical processor 150a-150n.

Of course, one of skill in the art will recognize that the execution core 330 may process instructions in program order and need not necessarily provide out-of-order processing. In such case, the retirement queue 364 is not a reorder buffer, but is merely a buffer that maintains instructions, in program order, until such instructions are retired. Similarly, the execution resources 362 for such an in-order processor do not include structures whose function is to re-order and track instructions for out-of-order processing.

Figure 4:
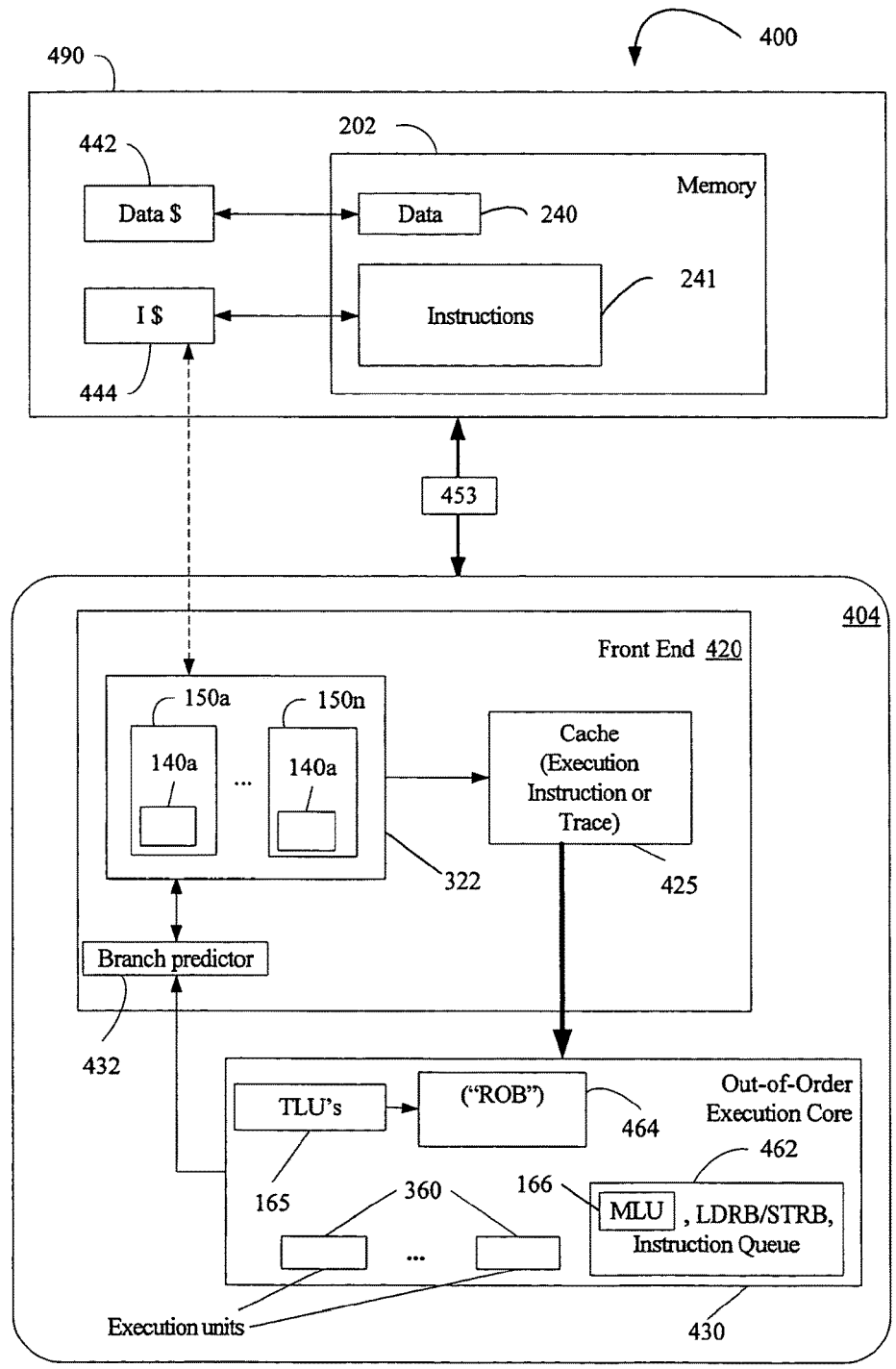
FIG. 4 is a block diagram illustrating a memory hierarchy for at least one embodiment of a processing system that includes a thread livelock unit for each of a plurality of logical processors.

FIG. 4 is a block diagram illustrating at least one embodiment of a multi-threaded out-of-order processing system 400 capable of practicing disclosed techniques. Like elements in FIG. 4 and FIGS. 1, 2, and/or 3 bear like reference numerals. FIG. 4 illustrates that the processing system may include a memory subsystem 490, a processor 404 and a memory controller 453.

FIG. 4 illustrates that the processor 404 may include a front end 420 along the lines of front end 320 described above in connection with FIG. 3. Front end 420 supplies instruction information to an execution core 430. For at least one embodiment, the front end 420 may supply the instruction information to the execution core 430 in program order.

The front end 420 may include a fetch/decode unit 322 having multiple independent logical sequencers 340a-340n, one for each of multiple logical processors 150a-150n. For at least one embodiment, the front end 420 prefetches instructions that are likely to be executed. A branch prediction unit 432 may supply branch prediction information in order to help the front end 420 determine which instructions are likely to be executed.

At least one embodiment the execution core 430 prepares instructions for out-of-order execution, executes the instructions, and retires the executed instructions. The execution core 430 may include TLU's 165. The execution resources 462 for the processor 404 may include the MLU 166, an instruction queue, load request buffers and store request buffers.

The MLU 166 is designed to alleviate livelock related to the following design feature: logical processors 150a-150n may share resources of a memory system 490. Accordingly, an older (in program order) memory instruction from one logical processor 150 may be blocked by a younger memory instruction from another logical processor 150. The MLU 166 is designed to detect and correct this situation. The MLU may stall one logical processor so that another logical processor can complete one or more memory operations.

The execution core 430 may include retirement logic that reorders the instructions, executed in an out-of-order manner, back to the original program order in a retirement queue 464, referred to as a reorder buffer ("ROB"). This retirement logic receives the completion status of the executed instructions from the execution units 360. The execution core 430 may include more than one reorder buffer 464. That is, a portion of a single partitioned reorder buffer 464 may maintain unretired instruction information for all logical processors 150a-150n. Alternatively, a separate reorder buffer 464 may be maintained for each logical processor 150.

The execution core 430 may also report branch history information to the branch predictor 432 at the front end 420 of the processor 404 to impart the latest known-good branch-history information.

As used herein, the term "instruction information" is meant to refer to basic units of work in a final format that can be understood and executed by the execution core 430. Instruction information may be stored in a cache 425. The cache 425 may be implemented as an execution instruction cache or an execution trace cache. For embodiments that utilize an execution instruction cache, "instruction information" includes instructions that have been fetched from an instruction cache 444. Such fetched instructions may or may not be decoded into micro-operations before they are stored in the execution instruction cache. For embodiments that utilize a trace cache, the term "instruction information" may include traces of micro-operations that have been decoded from macroinstructions. For embodiments that utilize neither an execution instruction cache nor trace cache, "instruction information" may also include raw bytes for instructions that may be stored in an instruction cache (such as I-cache 444).

The processing system 400 includes a memory subsystem 490 that may include one or more caches 442, 444 along with the memory 202. Although not pictured as such in FIG. 4, one skilled in the art will realize that all or part of one or both of caches 442, 444 may be physically implemented as on-die caches local to the processor 404. The memory subsystem 490 may be implemented as a memory hierarchy and may also include an interconnect 453 in order to facilitate the transfer of information, such as data 240 and/or instructions 241, from memory 202 to the hierarchy levels. One skilled in the art will recognize that various configurations for a memory hierarchy may be employed, including non-inclusive hierarchy configurations.

It will be apparent to one of skill in the art that, although only an out-of-order processing system 400 is illustrated in FIG. 4, the embodiments discussed herein are equally applicable to in-order processing systems as well. Such in-order processing systems typically do not include ROB 464. Nonetheless, such in-order systems may still include a retirement queue (see 364, FIG. 3) in order to track unretired instructions.

Figure 5:
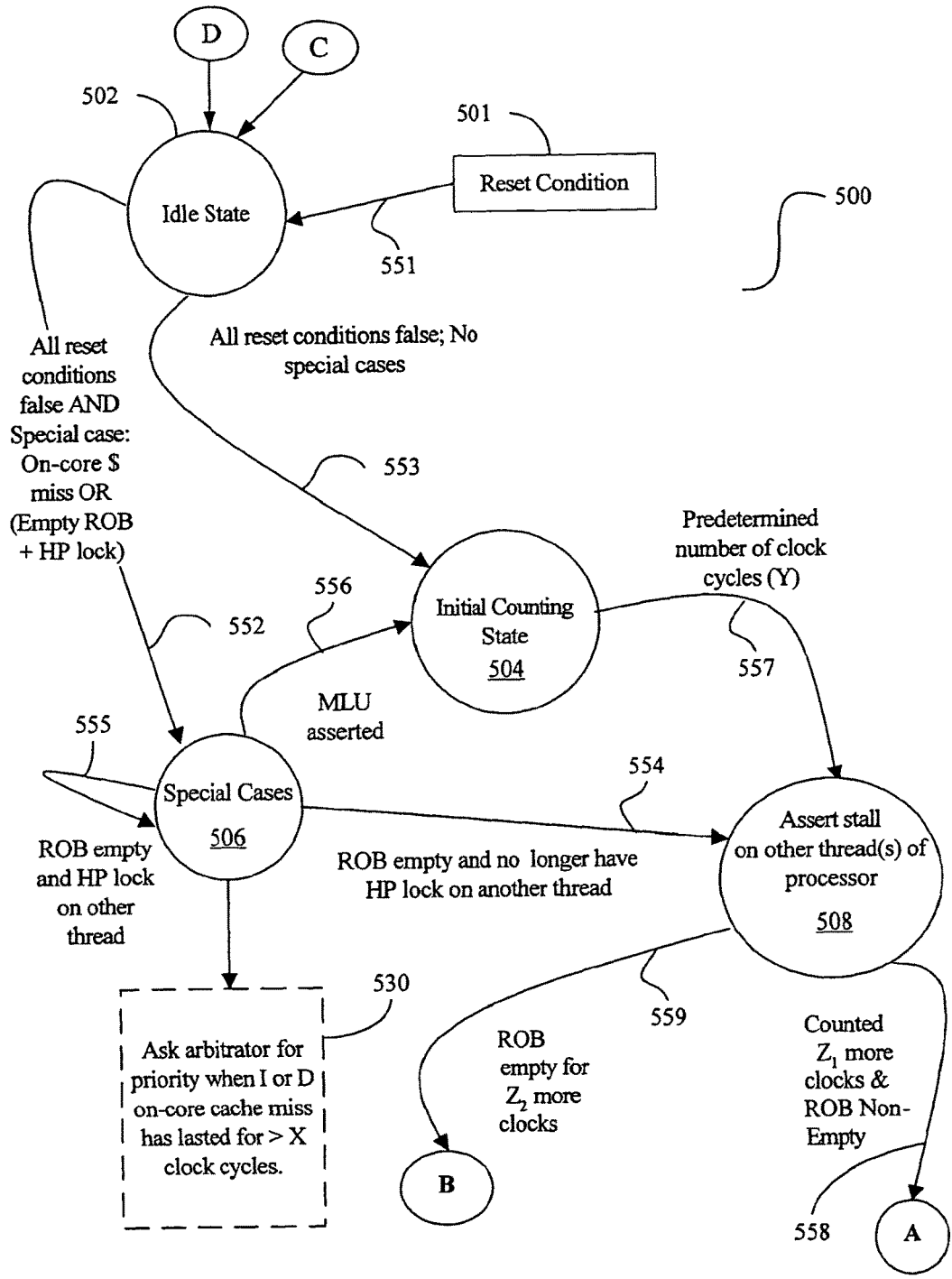
FIGS. 5 and 6 are state diagrams illustrating at least one embodiment of a method for detecting and alleviating livelock among multiple concurrent threads.
Figure 6:
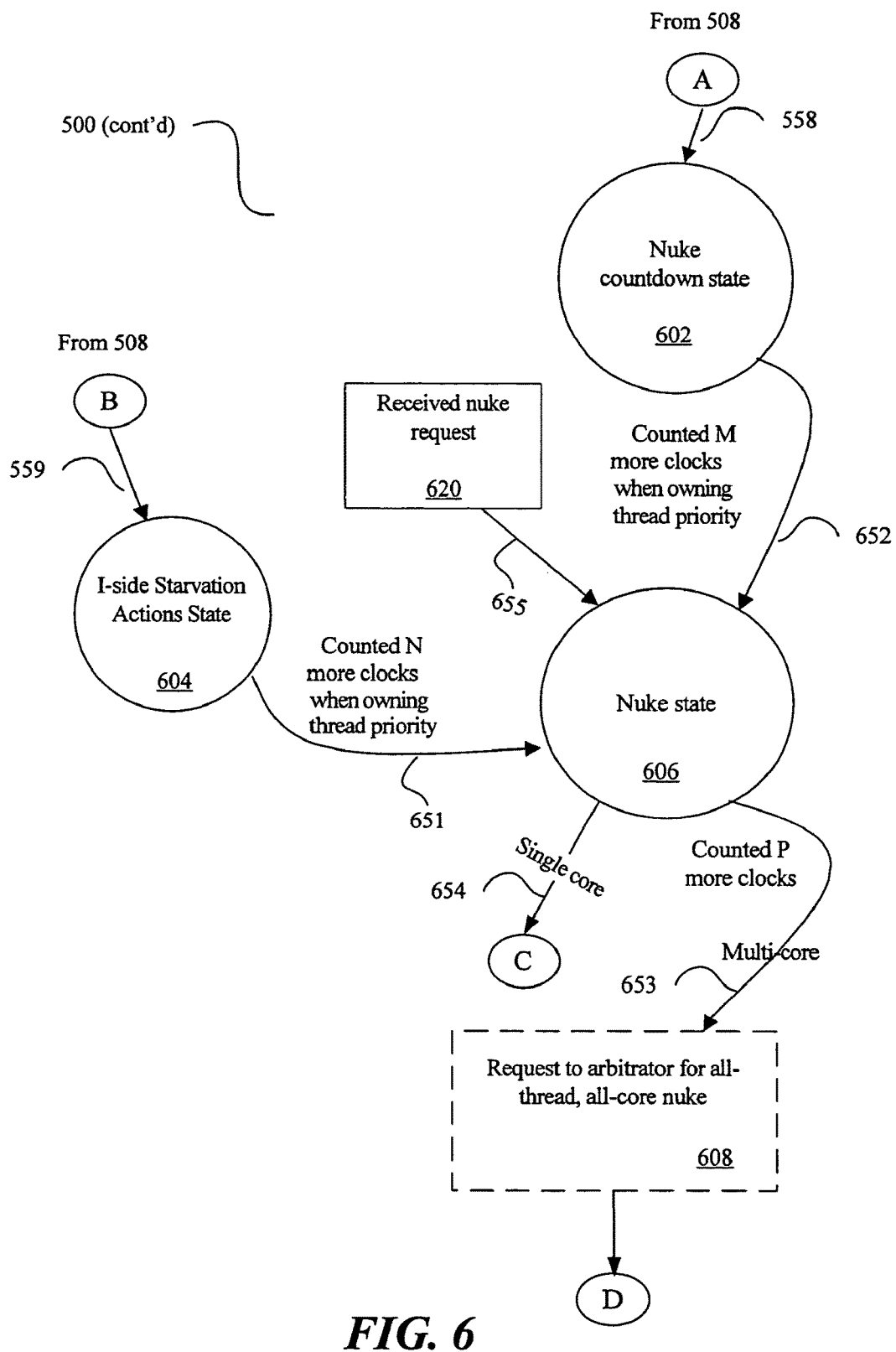
Figure 7:
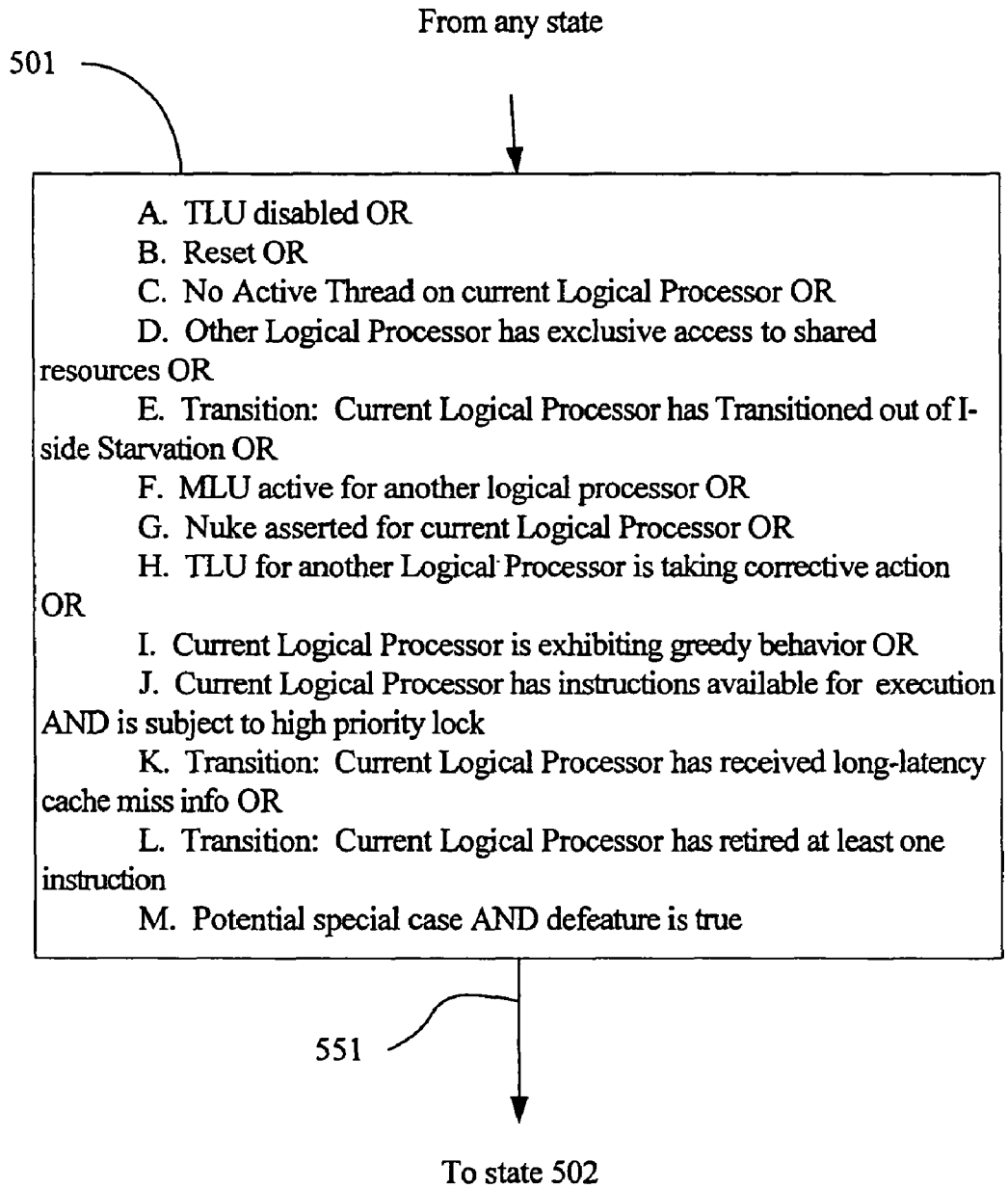
FIG. 7 is a block diagram illustrating reset conditions for entry into an idle state for the method illustrated in FIGS. 5 and 6.

FIGS. 5, 6 and 7 together present a state diagram that illustrate at least one embodiment of a method 500 for determining that a livelock condition exists among a plurality of concurrent threads and for taking action to alleviate the livelock condition. For at least one embodiment, a thread livelock unit, such as TLU 165 illustrated in FIGS. 1-4, may perform the method 500. The TLU 165 may be a hardware unit that implements the method 500 as a state machine.

FIG. 5 is now discussed with reference to FIGS. 3 and 4. As way of background for FIG. 5, it is helpful to understand that, for at least one embodiment of an SMT processor, such as processors 104 and 404 illustrated in FIGS. 3 and 4, respectively, each logical processor 150 maintains a complete set of the architecture state. In addition, certain features of the processor, such as a retirement queue 364 or ROB 464, and execution resources 362, 462, may maintain microarchitectural state information for each of the currently active software threads. Upon certain conditions, an active thread may be stalled and the microarchitectural state for the thread may be flushed, or "nuked," from the SMT logical processor 150. By stalling and "nuking" the microarchitectural state of non-selected logical processors (which may well be making forward progress), a selected logical processor may be thus afforded relief from current beat patterns and may be able to make forward progress without interference from the non-selected logical processors.

FIG. 5 illustrates that the method 500 includes an idle state 502. FIG. 5 further illustrates that the idle state 502 may be entered 551 when one or more reset conditions 501 are met. In order to simplify FIGS. 5 and 6, the arrow 551 between block 501 and state 502 indicates satisfaction of any reset condition 501. One of skill in the art will recognize that, for one or more of the reset conditions, transition to state 502 may occur from one of the other states 504, 506, 508, 602, 604, 606, illustrated in FIGS. 5 and 6. However, for the sake of simplicity, arrows denoting such transitions are not illustrated in FIGS. 5 and 6.

Turning to FIG. 7, one can see at least one embodiment of the one or more reset conditions 501. FIG. 7 is discussed herein with reference to FIGS. 4 and 5. For at least one embodiment, reset conditions 501 may be applied in either a single-core processing system or a multi-core processing system. In the following discussion, the term "current logical processor" is meant to refer to the logical processor 150 associated with the TLU 165 performing the method 500 to determine whether the reset conditions 501 are true. Thus, although one or more of the other TLU's 165-165n in a processor 104 may also be concurrently performing the method 500, the "current logical processor" is the logical processor of interest, as opposed to the other logical processors 150 of a processor 104.

FIG. 7 illustrates that one or more of the reset conditions 501 may become true when the TLU 165 is any other state illustrated in FIGS. 5 and 6, including states 502, 504, 506, 508, 602, 606, and 604. If one or more of the reset conditions 501 become true, a transition to state 502 is triggered. As is stated above, the transition from any other state to state 502 is subsumed by arrow 551, which indicates transition to idle state 502 from any other state.

FIG. 7 illustrates that condition A of the reset conditions 501 indicate that a TLU 165 should remain in/return to the idle state 502 if its TLU 165 has been disabled. Such condition A reflects an assumption that, for at least one embodiment, the TLU 165 may be disabled. For at least one embodiment, for example, the TLU 165 may be disabled during execution of an exception-handling routine. During such routine, which may be performed by microcode or other firmware, livelock detection may be disabled. One example of an exception that might cause a TLU 15 to be disabled is the assertion of a signal, such as a stopclock signal, which indicates that the chipset (see, e.g., 255, FIG. 2) has requested that the processor 104 transition into a low power state.

FIG. 7 illustrates that condition B of the reset conditions 501 indicate that a TLU 165 should remain in/return to the idle state 502 if a reset trigger has been detected. Upon detection of such reset trigger, the TLU 165 effectively resets its livelock determination activity by remaining in/returning to the idle state 502. For at least one embodiment, a reset trigger may be activated by a user-initiated event such as activation of an init pin or a power-down reset.

FIG. 7 illustrates that condition C of the reset conditions 501 indicate that a TLU 165 should remain in/return to the idle state 502 if its associated logical processor 150 is idle and therefore is not currently attempting to execute a software thread. Such condition may be detected by the TLU 165, for at least one embodiment, by examining a register than maintains a "thread active" indicator for the TLU 165.

FIG. 7 illustrates that condition D of the reset conditions 501 indicate that a TLU 165 should remain in/return to the idle state 502 if another logical processor 150 of the processor core 104 is in an exclusive access mode. During exclusive access mode, one logical processor may be taking action of which all other logical processors need to be aware. For example, there may be times when one logical processor is executing an instruction that effects re-partitioning of a shared resource, such as the ROB 464. Or, for example, one logical processor may execute an instruction that makes a global change such as setting a cache disable bit in a control register. In such circumstances, all other logical processors should stall execution until the exclusive access operation has been completed. During such time, a stalled TLU 165 should not expect its logical processor to make forward progress, and should therefore remain in/return to the idle state 502. For at least one embodiment, the TLU 165 may determine whether condition D is met by examining a shared signal (which may be reflected, for instance, in a microarchitectural register) to determine whether another logical processor 150 of the processor 104 is in an exclusive access mode.

FIG. 7 illustrates that condition E of the reset conditions 501 indicate that a TLU 165 should remain in/return to the idle state 502 if the TLU's 165 logical processor 150 has transitioned out of the I-side starvation action state 604 (FIG. 6). Such transition indicates that successful actions (discussed below in connection with state 604) have been taken in an attempt to alleviate I-side starvation on the current logical processor 150, and the TLU 165 should therefore return to the idle state 502 to begin a new livelock detection sequence in order to give the starvation-avoidance actions time to take effect.

FIG. 7 further illustrates that condition F of the reset conditions 501 indicate that a TLU 165 should remain in/return to the idle state 502 if the memory livelock unit 166 is currently active. Via this condition F, the TLU 165 concedes priority to the memory livelock unit 166. Such prioritization scheme is useful in order to prevent a livelock that is induced by contention between a TLU 165 and the MLU 166. That is, as is stated above, the MLU 166 may stall one logical processor's 150 memory operation(s) so that another logical processor can complete one or more memory operations. Without reset condition F, the stalled logical processor may erroneously determine that it is unable to make forward progress due to an undesirable livelock condition. Condition F assures that, in such situations, the TLU 165 gives priority to the MLU 166. Accordingly, reset condition F assures that each TLU 165 and the MLU 166 are aware of, and work cooperatively with, each other.

FIG. 7 further illustrates that condition G of the reset conditions 501 indicate that a TLU 165 should remain in/return to the idle state 502 if a "nuke" action has been asserted for its logical processor. A nuke action for a logical processor 150 has the following result: the current instruction, as well as any other instructions necessary to fully complete execution of the current macro-operation, are completed. All further instruction execution is stalled and all pipelines, and associated microarchitectural state, for the logical processor 150 are flushed. In this manner, not only is processing for the thread stalled, but its microarchitectural state is flushed.

Condition G for a current logical processor may be true, for example, if an all-"nuke" action has been initiated by another of the logical processors 150a-150n. Such condition could be satisfied, for example, if another logical processor has instituted an all-"nuke" action as a result of completion of state 606. In such case, the current logical processor will, for at least one embodiment, be stalled and its microarchitectural state will be flushed; the TLU 165 for the current logical processor should therefore return to the idle state 502.

Alternatively, condition G could be satisfied for a particular logical processor even if another logical processor has not completed state 606. Instead, a "nuke" action for the current logical processor 150 may be initiated by any of several other events in the processor that are not otherwise associated with the states of method 500. For example, the "nuke" event could be asserted as a result of an interrupt on the current logical processor 150 in order to provide for precise exception-handling for an out-of-order processor 104.

FIG. 7 further illustrates that condition H of the reset conditions 501 indicates that a TLU 165 should remain in/return to the idle state 502 if another logical processor's TLU 165 has become "active" and is in the process of taking livelock breaker action. By virtue of condition H, a second TLU 165 is designed to yield to a first TLU 165, if the first TLU 165 has transitioned from a detection stage (see 502, 504, 506) to a stage (see 508, 602, 606, 604) for which the first TLU 165 is "active" in the sense that it takes some type of corrective action to attempt to alleviate a livelock condition. Satisfaction of condition H necessitates that each TLU 165 be aware of the state of the other TLU's 165 on the processor (FIG. 3 illustrates that, for at least one embodiment, all TLU's 165a-165n communicate with each other).

There could arise a "tie" situation in which more than one TLU 165 attempts to transition into an active state during the same clock cycle. In such case, priority may be given to only one of the requesting TLU's 165. For example, priority may be assigned to the lowest-numbered TLU (i.e. 165a has higher priority than 165b, so 165b goes back to the idle state 502). Alternatively, many other priority selection mechanisms may be utilized. For at least one embodiment, the priority mechanism is enforced by an arbitrator (see, e.g., 180 of FIG. 1). The arbitration policy utilized to assign priority in such cases may be, but need not necessarily be, the same policy utilized at block 806 described in below in connection with FIG. 8.

FIG. 7 further illustrates that condition I of the reset conditions 501 indicate that a TLU 165 should remain in/return to the idle state 502 if it has exhibited greedy behavior and is thus likely to be contributing to a livelock condition on another logical processor 150. Such greedy behavior may be identified in any of several ways. That is, a TLU 165 should not necessarily remain in a non-idle state if its logical processor's 150 ROB 364 portion is empty for a reason other than I-side starvation, such as a processor 150 whose ROB 364 portion is empty because one of its execution resources is full For example, a logical processor 150 may be exhibiting greedy behavior by issuing a series of store instructions that tie up the system's memory bandwidth and cause the store buffer for the current logical processor 150 to be full of store instructions. For at least one embodiment, a logical processor's 150 processing of instructions may be stalled until the execution resource (such as for example, a store buffer) is no longer full. During the time that the logical processor 150 is thus stalled, ROB 364 portion for the current logical processor may be empty, but another execution resource (i.e., the store buffer) is full. Thus, for condition I, the greedy behavior may be identified when the allotted portion of the ROB 364 for the current logical processor 150 is empty, but its store buffer (or any other specified execution resource) is full of retired store instructions whose data has not yet been committed to a cache or memory. In such case, the current logical processor 150 returns to the idle state 502 and implicitly yields priority in case another logical processor's TLU 165 needs to go active.

FIG. 7 further illustrates that condition J of the reset conditions 501 indicate that a TLU 165 should remain in/return to the idle state 502 if the TLU's 165 logical processor has instructions available for execution and another logical processor is performing a high-priority lock sequence. A high-priority lock sequence may be, for example, an atomic instruction. For an atomic instruction, the memory logic of the processor works only on the locked thread until the locked operation is completed, no matter how long it takes. This type of high-priority lock sequence may represent the highest priority in the processor. Accordingly, reset condition J enforces this priority by remaining in/returning to the idle state 502 if another logical processor is currently processing this type of high-priority lock operation. If the other processor is performing a series of high-priority lock operations, such that the current logical processor 150 cannot execute one of its own memory instructions for a long period of time, then the MLU 166 will presumably be invoked to allow the current logical processor to execute its memory instruction. Thus, in light of competing memory instructions between two logical processors, the MLU 166 can protect one logical processor from being stalled for an unacceptably long amount of time due to a series of high-priority locks on another logical processor.

However, reset condition J is not satisfied if the current logical processor has no instructions to execute (i.e., the current logical processor's ROB 464 portion is empty). That is, if another logical processor is currently processing a high-priority lock operation, but the current logical processor's ROB 464 portion is empty, then the TLU 165 does not return to the idle state 502. If the ROB portion 464 is empty, the current logical processor has no instructions to process. Thus, the MLU 166 cannot be relied upon to protect the current logical processor from being subject to a series of high-priority lock operations performed by another logical processor. In such case, the TLU 165 is responsible for protecting the current logical processor from being stalled too long in the face of such a series of high priority lock operations. Accordingly, the current TLU 165 should proceed to determine whether it should perform I-side starvation avoidance actions at stage 506, if the current logical processor 150 has an empty ROB 464 portion and there is a high-priority lock in progress on another thread.

FIG. 7 further illustrates that condition K of the reset conditions 501 indicate that a TLU 165 should remain in/return to the idle state 502 if the current logical processor 150 has received long-latency data. For at least one embodiment, condition K is satisfied when a logical processor that has been waiting for data or instructions as a result of a cache miss finally receives the data or instructions. At such time, the current logical processor should return to the idle state 502. This is because, if the current logical processor 150 does not return to the idle state 502 in response to satisfaction of condition K, the logical processor 150 might erroneously proceed to send a cache-miss-related priority request 530 to the arbitrator 180 (FIGS. 1 and 2) (see discussion of state 506, below).

FIG. 7 further illustrates that condition L of the reset conditions 501 indicate that a TLU 165 should remain in/return to the idle state 502 if the current logical processor 150 has retired at least one final-format instruction during the relevant time frame. For at least one embodiment, the final-format instruction is a micro-operation, and the relevant time period is a single clock cycle. If condition L is satisfied, then we say that the current logical processor 150 has made forward progress in the execution of its thread instruction stream. Accordingly, no livelock condition exists, and the TLU 165 should return to or remain in the idle state 502.

FIG. 7 further illustrates that condition M of the reset conditions 501 indicate that a TLU 165 should remain in/return to the idle state 502 if the ability of the logical processor to send a priority request 530 to the arbitrator (180, FIGS. 1 and 2) (see discussion of state 506, below) has been disabled. When the ability of the logical processor 150 to send a priority request 530 to the arbitrator 180 (FIGS. 1 and 2) is disabled, we say that a "defeature" is true. Condition M may be satisfied when 1) any condition that might otherwise lead to sending of a priority request 530 from state 506 is true and 2) the defeature is true. In such case, even if the conditions for sending the priority request 530 from state 506 is true, the logical processor 150 cannot send the request. Accordingly, the logical processor 150 should remain in/return to the idle state 502, rather than transitioning to/remaining in the special cases state 506 (discussed below).

For at least one embodiment, the first part of condition M (namely, "1) any condition that might otherwise lead to sending of a priority request 530 from state 506 is true") may be satisfied if the logical processor 150 is experiencing an on-core cache miss (data or instruction) and is waiting for instructions or data from an off-core source (such as, for example, off-core shared cache 251 or off-chip memory 202). Such miss may occur, for example, if 1) a cache miss occurred for a load instruction, and the load instruction is at retirement, but cannot retire because the load data is not available on the processor core 104 (i.e., is not available in any on-core cache nor in the Load Buffers ("LDRB's")). Such miss may also occur, for example, if 2) the logical processor 150 is experiencing an on-core miss for an instruction fetch, and is waiting for the instruction information from an off-core source (such as, for example, off-core shared cache 251 or off-chip memory 202), OR 3) the logical processor 150 is experiencing an on-core miss for a STA micro-op (which may be a final-format Store-Address micro-operation related to a Store macroinstruction) and is therefore waiting for an off-core retrieval of the memory location indicated by the Store-Address micro-operation.

Again, such third condition is satisfied if the STA micro-op is at retirement, but cannot retire because the memory location (Store-Address) to which the data associated with the Store instruction is to be written, is not on the processor core 104, either in a cache or the Store Buffers ("STRB's"). Ordinarily, any of these three conditions would cause the TLU 165 to transition to the special cases state 506. However, if the defeature is true, reset condition M indicates that such transition should not occur, because the ability of the logical processor 150 to send a priority request 530 under such conditions has been disabled.

Returning to FIG. 5, one can see the other states 504, 506 that may be entered by the TLU 165 to determine whether a livelock condition exists. Such states 504, 506, along with the idle state 502, are referred to herein as "detection" states. While the TLU 165 is in such a detection state 502, 504, 506, it is not considered to be "active" because it is merely monitoring for certain conditions and is not taking any affirmative action to attempt to break a livelock. As such, the logical processor 150, while in one of the detection states 502, 504, 506, will not trigger reset condition H of the reset conditions 501 discussed in connection with FIG. 7, and will therefore not cause the other logical processors, see 150*a*-150*n*, to concede priority to the current logical processor 150.

Entry into the two remaining detection states, 504 and 506, is differentiated by whether or not the condition that has caused the logical processor 150 to transition out of the idle state 502 is 1) one that might eventually benefit from sending of a priority request 530 to the arbitrator 180 (FIGS. 1 and 2) OR 2) the case that the logical processor 150 may be suffering from I-side starvation but is blocked from taking action by high-priority lock on another thread (Such conditions are referred to herein as "special cases"). If so, then the TLU 165 transitions 552 from the idle state 502 to the special cases state 506. Otherwise, the TLU 165 transitions 553 from the idle state 502 to the initial counting state 504. Each of these states 504, 506 is discussed in further detail, separately, below.

The special cases state 506 is entered 552 from the idle state 502 when 1) none of the reset conditions 501 are true, AND 2)
  a. the logical processor 150 is experiencing an on-core cache miss OR
  b. the logical processor 150 has an empty ROB 464 but there is a high-priority ("HP") lock in progress on another logical processor.

In the latter case (condition 2b), the current logical processor 150 may be experiencing I-side starvation. However, the current logical processor 150 is also subject to a stall because another thread is performing a high-priority lock operation. Accordingly, until the high-priority lock operation is lifted, the current logical processor 150 should not proceed to any "active" state.

In the former case, (2a) the logical processor 150 is experiencing an on-core cache miss. For at least one embodiment, such on-core cache miss may be determined by examining the three conditions discussed above in connection with condition M of the reset conditions 501: at-retirement load or STA instruction, or instruction fetch that cannot complete. Of course, one of skill in the art will realize that such embodiment should not be taken to be limiting, and that detection of an on-core cache miss may be determined for other embodiments by evaluating other, or additional, conditions. In any event, when a logical processor 150 is experiencing an on-core cache miss (and the defeature is not true), then the TLU 165 transitions 552 to the special cases state 506 in order to allow for sending of a priority request signal 530, to the arbitrator 180, which is minimally disruptive to other logical processors, rather than transitioning directly to a more severe action state, such as stall assertion state 508, which expressly interferes with processing of other logical processors.

During the special cases state 506, the TLU 165 may utilize a counter to count the number of clock cycles that have elapsed since entering the special cases state 506. For alternative embodiments, any other approach for measuring elapsed time may be employed rather than, or in addition to, the counting of clock cycles. After expiration of a predetermined number of clock cycles (X), the TLU 165 may assert a priority request 530. The priority request 530 is issued if 1) the current logical processor 150 is experiencing a cache miss, and 2) the predetermined amount of time (X) has elapsed since the TLU 165 entered this occurrence of the special cases state 506.

The priority request 530 goes to the arbitrator 180 (FIGS. 1 and 2), and requests that the arbitrator 180 give memory requests for the current logical processor 150 higher priority than memory requests from other logical processors (see 150*a*-150*n*). Alternatively, the priority request 530 may request that the arbitrator 180 give memory requests for the current processor core 104 priority over other processor cores in a multi-core embodiment (see 104*a*-104*n*, FIG. 2). For the latter embodiment, the priority request 530 is not useful in a single-core system (see FIG. 1). Accordingly, the optional nature of a core-specific priority request 530 for a single-core embodiment is denoted by dotted lines in FIG. 5. After issuing the priority request 530, the TLU 165 may remain in the special cases state 506 until one of the exit conditions discussed below becomes true.

The logical processor remains 555 in the special cases state 506 as long as the portion of the ROB 464 associated with the TLU's 165 logical processor 150 is empty, and any other logical processor, see 150*a*-150*n*, for the processor core 104 is performing a high-priority lock operation. If, however, the TLU 165 determines during the special cases state 506 that the HP lock-in-progress indicator for another logical processor has transitioned from true to false, then the TLU 165 exits the special cases state 506 and enters 554 an "active" state, the stall assertion state 508, during which the current logical processor 150 may assert a stall to other logical processors. The initial counting state 504 is thus bypassed if the ROB 464 portion is empty. The transition 554 from state 506 to state 508 implements high-priority processing when the ROB 464 portion is empty because it does not take time to perform the initial countdown state 504. The countdown takes too long if the ROB 464 is empty; the logical processor doesn't have any instructions in this case, and the TLU 165 is thus designed to get more instructions into the ROB 464 as soon as possible.

FIG. 5 illustrates that the TLU 165 may also transition 556 out of the special cases state 506 if it determines that the memory livelock unit 166 for its core 104 has been triggered. In such case, the TLU 165 transitions 556 from the special cases state 506 to the initial counting state 504. Under such operation, the TLU 165 concedes temporary priority to the MLU 166, in order to allow the MLU 166 logic to attempt to break the potential livelock that is developing as a result of the long-latency on-core cache miss that the logical processor 150 may be experiencing (see condition 2a, discussed above, for entry into special cases state 506). During its processing, the MLU 166 may assign priority to a particular thread. By conceding priority to the MLU 166 at transition 556, the TLU 165 avoids effectively assigning priority to the current logical processor while the TLU 166 has assigned priority to a different logical processor 150. In this manner, the TLU's 165 and the MLU 166 work together to assign priority to only one thread at a time. The TLU 165 thus transitions 556 to the initial counting state 504 in order to allow the MLU 166 the full predetermined time period Y (see further discussion of state 504 below) before determining that the MLU 166 has not been able to alleviate the memory livelock, and that the current logical processor 150 is still unable to make forward progress after an acceptable amount of time.

It should be noted that, in accordance with reset condition K discussed above in connection with FIG. 7, the TLU 165 transitions 551 back to the idle state 502 from the initial counting state 504 if the MLU 166 is able to successfully break the memory livelock such that the missed cache information (data or instructions) is finally received.

It should also be noted that, in accordance with reset condition K, transition 551 from special cases state 506 back to the idle state 502 can also occur without assistance from the MLU 166 if, as part of normal processor operations, the requested data or fetched instructions are finally received.

As is stated above, if neither of the special case conditions exist (on-core cache miss or empty ROB+HP lock) and none of the reset conditions 501 are true, then the TLU 165 transitions 553 from the idle state 502 to the initial counting state 504. During the initial counting state, the TLU 165 maintains a timer to determine if the TLU 165 has been in the initial counting state 504 for a predetermined amount of time, Y. This predetermined amount of time, Y, may be determined to reflect that amount of time after which, if the current logical processor 150 has been unable to make forward progress, it is assumed that the current logical processor 150 is experiencing a livelock condition.

For at least one embodiment, the TLU 165 maintains during the initial counting state 504 a count-down timer, where the timer is set to the predetermined amount of time, Y, and then decrements the counter every clock cycle. If the counter reaches 0 (or some other predetermined minimum value), the logical processor 150 may be in a livelock condition, and transition to an "active" state may be warranted. The countdown of the timer from the predetermined timer value, Y, to the predetermined minimum value thus represents, for at least one embodiment, a predetermined number of clock cycles for which lack of forward progress will be tolerated.

It should be noted that, if any reset condition 501 becomes true during the initial counting state 504, the TLU 165 will transition to the idle state 502 and the counter utilized during the initial counting state 504 may be re-initialized. One such reset condition, condition L, is the retirement of a final-format instruction. If such retirement does not occur during the initial counting stage 504, then the current logical processor is not making forward progress in the execution of its instructions. The other reset conditions, A-K and M, may provide some other indication of likely forward progress. If none of the reset conditions occur during the predetermined number of clock cycles, then the TLU 165 transitions 557 from the initial counting state 504 to the stall assertion state 508.

FIG. 5 thus illustrates that the stall assertion state 508 may be entered from either the initial counting state 504 (see transition 557) or the special cases state 506 (see transition 554). During the stall assertion state 508, the TLU 165 asserts a stall signal to every logical processor 150*a*-150*n* of the processor 104, except its own logical processor (i.e., the current logical processor). Such action enforces a priority among all logical processors 150*a*-150*n* for a processor 104. For at least one embodiment, the stall signal asserted during the stall assertion state 508 renders the other logical processors (see 150*a*-150*n*) unable to issue instructions to the execution units 360 while the stall signal is asserted. The TLU 165 remains in the stall assertion state, and continues to assert the stall signal to every other logical processor 150 of the processor 104, until one of the following exit conditions is met.

FIG. 5 illustrates that at least one embodiment of the TLU 165 may exit 558 the stall assertion state 508 when a predetermined time period, which may be reflected as a number, $Z_1$, of clock cycles, has expired AND the portion of the ROB 464 associated with the current logical processor is not empty. In such case, because the appropriate ROB 464 portion is not empty, the current logical processor 150 is not experiencing instruction starvation. Nonetheless, the current logical processor 150 has been asserting a stall signal to all other logical processors for a period of $Z_1$ clock cycles and still has been unable to experience forward progress. Stalling the other logical processors has not permitted the current logical processor 150 to make forward progress, and additional action is therefore required in order to attempt to alleviate the livelock condition. The TLU 165 thus transitions 558 to state 602 of FIG. 6 when such exit condition is true.

If, on the other hand, the designated portion of the ROB 464 for the current logical processor 150 is empty, then the first exit condition for state 508 discussed immediately above is not true. Since the ROB 464 portion is empty, the current logical processor 150 may be experiencing instruction starvation. Accordingly, the if the ROB 464 portion is empty, the TLU 165 waits a predetermined amount of time, $Z_2$, before transitioning 559 to state 604 of FIG. 6, where the logical processor 150 may take actions to alleviate instruction starvation.

Turning to FIG. 6, which is discussed herein with reference to FIG. 4, one can see that the I-side starvation actions state 604 may be entered 559 from stall assertion state 508 in response to its ROB 464 portion being empty for at least the predetermined amount of time, $Z_2$. During the I-side starvation actions state 604, the TLU 165 takes one or more actions to attempt to get more instructions into the current logical processor's ROB 464 portion. These actions are referred to herein as starvation avoidance actions. During state 604, the TLU 165 de-asserts the stall signal, which was asserted during state 508, to the other logical processor(s) 150*a*-150*n*. During such assertion, the current logical processor 150 has failed to make forward progress; the stall has not helped and the current logical processor 150 is still experiencing a lack of instructions (i.e., its ROB 464 is still empty). Indeed, at the entry of state 604 it may be the case that the stall signal asserted during state 508 has been preventing another logical processor from completing execution of a macroinstruction, which may have prevented release of a resource needed by the current logical processor 150.

At the time of entry into state 604, it is assumed that the current logical processor is indeed suffering from instruction-side starvation (i.e., it lacks available instructions to execute). Such starvation may be due to any of several factors. For at least one embodiment, such factors may include: its instruction fetch request is being blocked at the memory instruction arbitration logic (not shown); one or more other logical processor(s) have been performing a series of high priority lock operations, or the current logical processor's 150 instruction fetch has repeatedly received a "not acknowledged" response from any structure utilized to process requests to the memory system.

During the I-side starvation state 604, the TLU 165 may take the following actions: 1) de-assert the stall signal to all other logical processors 150a-150n of the processor core 104; and 2) request that the current logical processor be given "thread priority." The "thread priority" request may be made to thread priority logic (not pictured). When the current logical processor assumes thread priority, the MLU 166 may be invoked.

Figure 9:
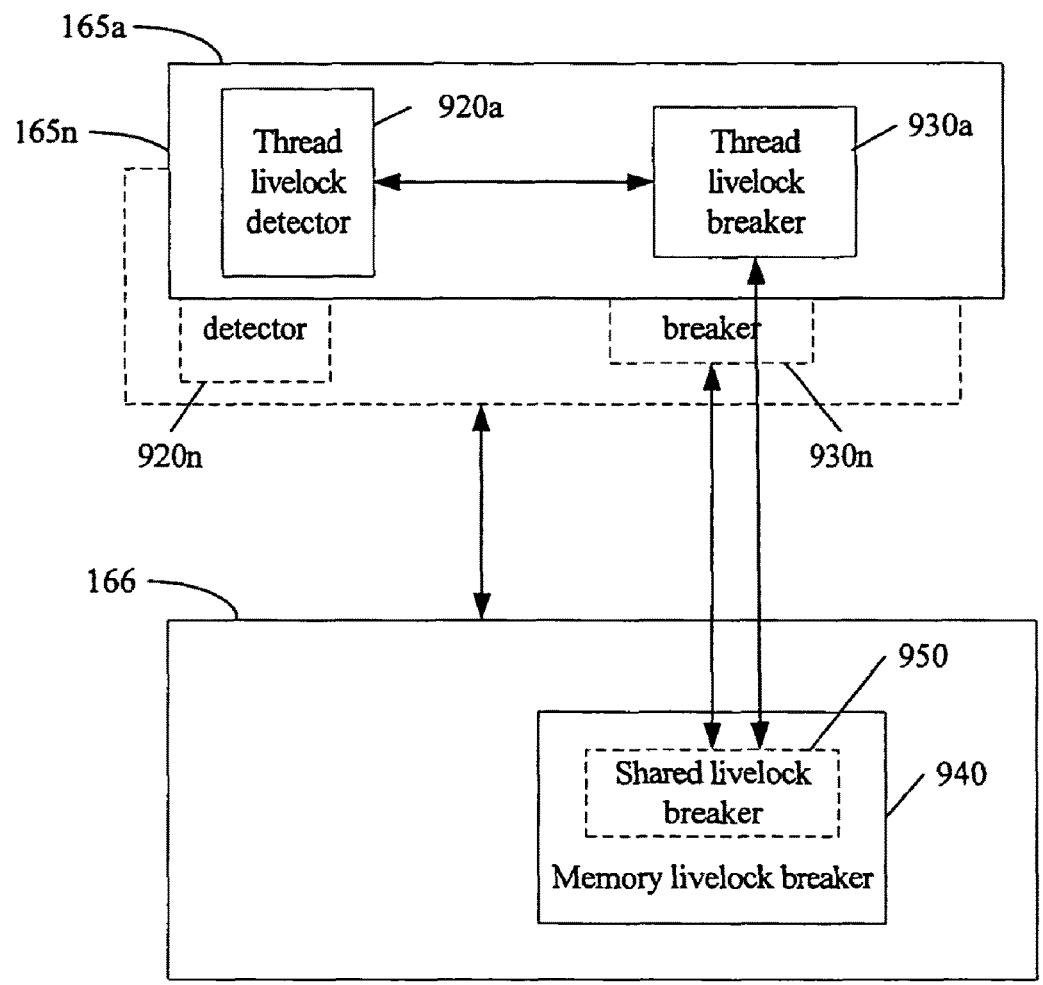
FIG. 9 is a block diagram illustrating at least one embodiment of livelock breaker logic shared among thread livelock units and a memory livelock unit.

Brief reference to FIG. 9 illustrates certain features of the TLU 165 and MLU 166 that may work together during at least one embodiment of the I-side starvation actions state 604 (FIG. 6). FIG. 9 is discussed herein with reference to FIGS. 3, 5 and 6. FIG. 9 illustrates that each TLU 165a-165n may include a livelock detector 920 and a livelock breaker 930. For at least one embodiment, the livelock detector 920 monitors for the reset conditions 501 and performs the detection stages 502, 504, 506. The livelock breaker 930 is responsible, for at least one embodiment, of performing the actions of the "active" states 508, 602, 604 and 606.

FIG. 9 illustrates that the MLU 166 includes a memory livelock breaker 940. The memory livelock breaker 940 is responsible, for at least one embodiment, for taking actions to alleviate a memory livelock condition, such as a prolonged on-core cache miss condition as discussed above.

FIG. 9 illustrates that the memory livelock breaker 940 of the MLU 166 may include shared livelock breaker logic 950. The shared livelock breaker logic 950 may be invoked during the I-side starvation action state 604, in response to the current logical processor gaining "thread priority." The shared livelock breaker logic 950 may be invoked by the TLU 165 for any logical processor 150a-150n on the processor core 104.

Returning to FIG. 6, it can be seen that the I-side starvation actions state 604 may be exited when the logical processor 150 suffering I-side starvation has had thread priority assigned to it for a contiguous predetermined time N (which may reflect a number of clock cycles) since the current logical processor was first given "thread priority." In such case, the TLU 165 transitions 651 to nuke state 606.

It should be noted that the transition 651 is made only when the actions taken during the I-side starvation actions state 604 are unsuccessful. For example, repeated detection of Self-Modifying Code (SMC) initiated by another logical processor my force the starved thread to continually discard and refetch instructions, thus keeping its ROB 464 portion empty. However, the I-side starvation avoidance actions taken during state 604 may well be successful in alleviating the instruction starvation condition. If so, then instructions will be fetched and will be sent to the allotted portion of the ROB 464 for the current logical processor 150. In such case, the current logical processor 150 will have, for at least one embodiment, transitioned out of an instruction-starvation condition. Accordingly, reset condition E (see 501, FIG. 7) will be true, and the TLU 165 will transition 501 from the I-side starvation actions state 604 to the idle state 502 (see FIG. 5).

FIG. 6 illustrates nuke countdown state 602 may be entered 558 from stall assertion state 508. During the nuke countdown state 602, again, the TLU 165 de-asserts the stall signal, which was asserted during state 508, to the other logical processor(s) 150a-150n. During such assertion, the current logical processor 150 has failed to make forward progress; the stall has not helped. Indeed, at the entry of state 602 it may be the case that the stall signal asserted during state 508 has been preventing another logical processor 150 from completing execution of a macroinstruction, which may have prevented release of a resource needed by the current logical processor 150. However, the stall may have perturbed the timing of the other logical processors, which may prove beneficial in helping the current logical processor 150 make forward progress.

When the nuke countdown state 602 is entered, the current logical processor 150 may be in a state that will eventually lead to forward progress. For example, the current logical processor 150 may be undergoing a memory livelock for which the MLU 166 is currently active, but needs more time to complete its livelock-breaker processing. During the nuke countdown state 602, the TLU 165 waits for a predetermined amount of time (which may be reflected, for example, as a count of M cycles) in hopes that the current logical processor 150 will achieve one of the reset conditions 501. For at least one embodiment, the M and N counts illustrated in FIG. 6 may be the same number, though such equality is not required for all embodiments.

FIG. 6 illustrates that, for at least one embodiment, the TLU 165 transitions 652 from the nuke countdown state 602 to the nuke state 606 upon the following condition: The current logical processor has been assigned "thread priority" and has held thread priority for a contiguous time frame, M. During this time, the current logical processor 150, despite its thread priority, has been unable to make forward thread progress. As is stated above, the TLU 165 may also transition 651 to the nuke state 606 if the current logical processor is instruction-starved; that is, if the I-side starvation actions taken during state 604 were not successful.

During state 606, the TLU 165 issues a core-internal "nuke" signal to each of the other logical processors (see 150a-150n) of the processor core 104. It is hoped that, as a result of such action, the current logical processor 150 will now be able to make forward progress. For a single-core embodiment, such as that illustrated in FIG. 1, processing for the method 500 may transition 654 to the idle state 502 from state 606 (see connector "C").

FIG. 6 illustrates that the nuke state 606 may also be entered 655, in response to an outside event, rather than as a result of one of the state transitions discussed above. Such outside event may be, for instance, receipt of an all-thread nuke request generated by a TLU 165 on another core at optional state 608 (discussed below).

From state 606, an optional state transition 653 may occur if the core-internal all-thread "nuke" signals issued during state 606 does not result in forward progress for the current logical processor 150 within a predetermined amount of time, P. It will be noted that state 608 is denoted with dotted lines in FIG. 6. Such is the case because transition 653 and state 608 are optional in the sense that they only apply for multi-core embodiments, such as the embodiment 200 illustrated in FIG. 2. At state 608, an all-core nuke request is sent to the arbitrator 180 (FIGS. 1 and 2). In response to the request generated at state 608, at least one embodiment of the arbitrator 180 initiates the following actions: all queues maintained by the arbitrator 180 are drained for all threads 150a-150n (except the current logical processor) on all cores 104a-140n. Also, all new all-core nuke requests are blocked (see block 806 of FIG. 8), except those emanating from the current logical processor 150. Finally, an all-thread nuke request (see discussion of state 508, above) is issued for every other processor core 104a-104n and is also issued for every other thread 150a-150n (except the current logical processor) on the processor core 104 associated with the current logical processor 150. (As is stated above, such nuke request, when received by the logical processors of the other processor cores, may cause the TLU's 165 for such logical processors to enter state 606—see above discussion of block 620). From state 608, the TLU 165 returns to the idle state (see connector "D").

Figure 8:
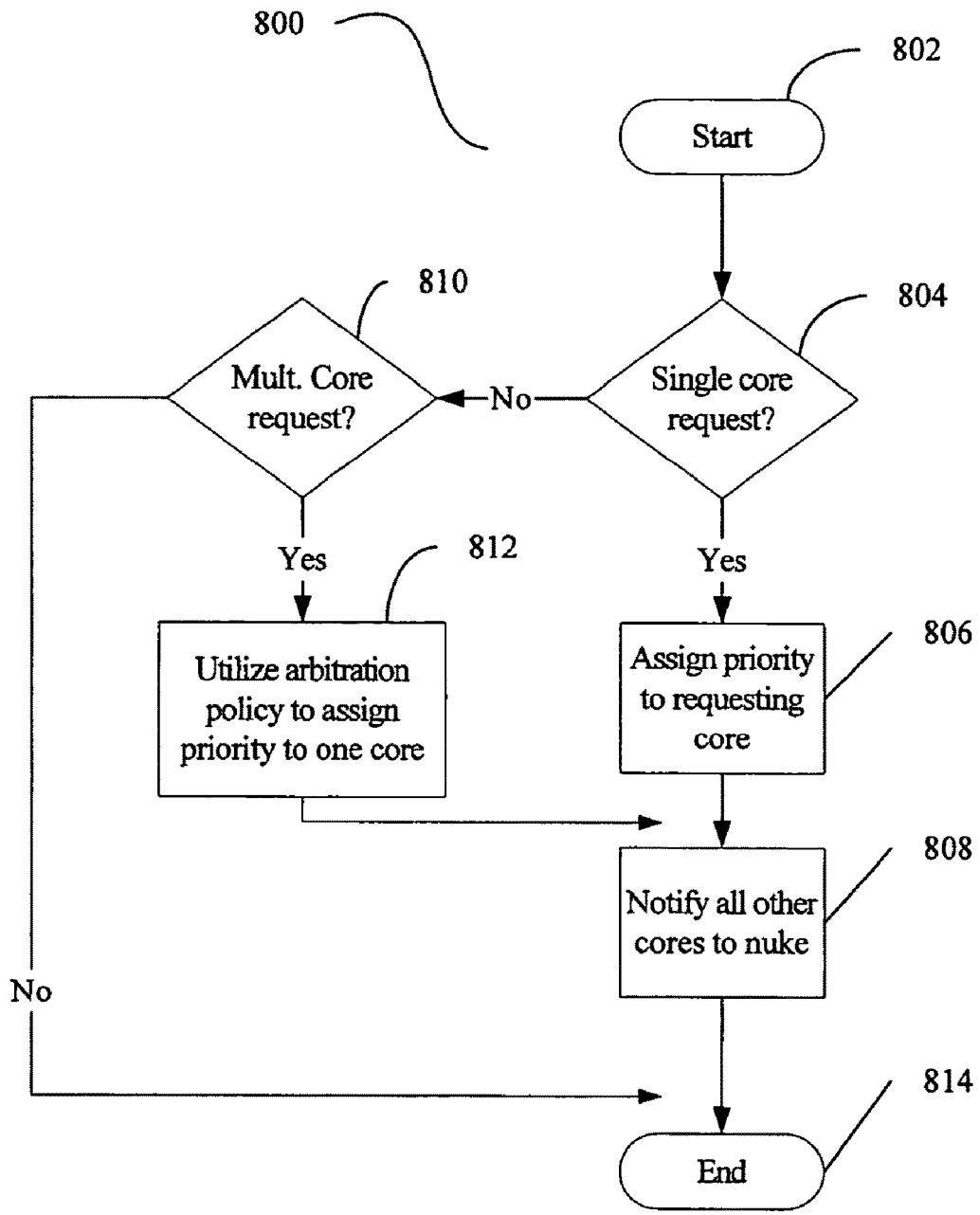
FIG. 8 is a flowchart illustrating at least on embodiment of a method for arbitrating livelock priority requests among a plurality of processors.

FIG. 8 is a flowchart illustrating a method 800 for processing all-core nuke requests such as those issued during state 608 for a multi-core embodiment. For at least one embodiment, the method 800 may be performed by an arbitrator, such as arbitrator 180 illustrated in FIGS. 1 and 2. The arbitrator may be, for at least one embodiment, included as part of an off-core portion 280 (FIG. 2) of logic referred to herein as an "uncore."

FIG. 8 illustrates that the method 800 begins at block 802 and proceeds to block 804. If a single all-core nuke request has been generated (i.e., from a TLU 165 on a first processor core 104*a*), then processing proceeds to block 806. As is described above in connection with the processing associated with state 608, the requesting core 104*a* is assigned priority at block 806, and all subsequent all-core nuke requests from the remaining cores 104*a*-104*n* disregarded.

Processing proceeds from block 806 to block 808. At block 808, an all-thread nuke request is initiated to all other cores 104*a*-104*n*, except the core from which the original all-core nuke request originated. Such request may be received by the other cores and cause them to transition to the nuke state 606 (see block 620, FIG. 6). Processing then ends at block 814.

If, however, two or more simultaneous all-core nuke requests are received from multiple cores, then processing proceeds to block 810 from block 804. At block 810, the method 800 applies an arbitration policy to select one of the multiple requesting cores as the priority core. For at least one embodiment, the requesting core may supply, along with the nuke request, a core ID to the arbitrator. The arbitrator 180 may then apply a simple selection algorithm, such as selecting the core with the highest or lowest ID, as the priority core. From block 810, processing proceeds to block 808 and then to block 814, as is described in the preceding paragraph.

The foregoing discussion describes selected embodiments of methods, systems and apparatuses to coordinate thread priority among a plurality of threads in order to allow forward progress in the execution of thread instructions, while also maintaining priority among livelock breaker logic, I-side starvation avoidance logic, and high-priority lock processing. The mechanisms described herein may be utilized with single-core or multi-core multithreading systems. In the preceding description, various aspects of methods, system and apparatuses have been described. For purposes of explanation, specific numbers, examples, systems and configurations were set forth in order to provide a more thorough understanding. However, it is apparent to one skilled in the art that the described method and apparatus may be practiced without the specific details. In other instances, well-known features were omitted or simplified in order not to obscure the method and apparatus.

Embodiments of the methods described herein may be implemented in hardware, hardware emulation software or other software, firmware, or a combination of such implementation approaches. Embodiments of the invention may be implemented for a programmable system comprising at least one processor, a data storage system (including volatile and non-volatile memory and/or storage elements), at least one input device, and at least one output device. For purposes of this application, a processing system includes any system that has a processor, such as, for example; a digital signal processor (DSP), a microcontroller, an application specific integrated circuit (ASIC), or a microprocessor.

A program may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

At least one embodiment of an example of such a processing system is shown in FIG. 4. Sample system 400 may be used, for example, to detect livelock conditions and to take corrective action to attempt to alleviate such conditions. Sample system 400 is representative of processing systems based on the Pentium®, Pentium® Pro, Pentium® II, Pentium® III, Pentium® 4, and Itanium® and Itanium® 2 microprocessors available from Intel Corporation, although other systems (including personal computers (PCs) having other microprocessors, engineering workstations, personal digital assistants and other hand-held devices, set-top boxes and the like) may also be used. For one embodiment, sample system may execute a version of the Windows™ operating system available from Microsoft Corporation, although other operating systems and graphical user interfaces, for example, may also be used.

Referring to FIG. 4, sample processing system 400 may include a memory system 490 and a processor 404. Memory system 490 may store instructions 241 and data 240 for controlling the operation of the processor 404.

Memory system 490 is intended as a generalized representation of memory and may include a variety of forms of memory, such as a hard drive, CD-ROM, random access memory (RAM), dynamic random access memory (DRAM), static random access memory (SRAM), flash memory and related circuitry. Memory system 490 may store instructions 241 and/or data 240 represented by data signals that may be executed by processor 404. The instructions 241 and/or data 240 may include code for performing any or all of the techniques discussed herein.

While particular embodiments of the present invention have been shown and described, it will be obvious to those skilled in the art that changes and modifications can be made without departing from the present invention in its broader aspects. For example, the counter values X, Y, Z1, Z2, M, N, P discussed above may be utilized as count-up or count-down counter values. Each such counter value may, but need not, be a different value. For example, for at least one embodiment, P>>M, P>>N, Z1>Y, Z2>Y, P>Z1, P>Z2, and X>Z1. Defaults for such counter values may be set in hardware. For some embodiments, default counter values may be programmable such that, for example, they may be modified by microcode or other firmware or software code.

Accordingly, one of skill in the art will recognize that changes and modifications can be made without departing from the present invention in its broader aspects. The appended claims are to encompass within their scope all such changes and modifications that fall within the true scope of the present invention.

What is claimed is:

1. A multicore multithreaded processor comprising:
a plurality of processor cores, each of said plurality of processor cores being a multithreading processor capable of executing a plurality of threads;
a livelock reducer coupled to communicate with each of the plurality of processor cores, said livelock reducer to receive thread progress information about a first thread from a first processor core and to adjust activity of a second thread of a second processor core of said plurality of processor cores in response to the thread progress information about said first thread from the first processor core, wherein the livelock reducer is further to receive subsequent thread progress information about the first thread from the first processor core after adjusting activity of the second thread and to request priority for the first thread in response to the subsequent thread progress information about said first thread.

2. The processor of claim 1, wherein:
said livelock reducer comprises a plurality of livelock circuits, at least one livelock circuit being associated with one of said plurality of processor cores.

3. The multicore multithreaded processor of claim 1 wherein said livelock reducer comprises:
arbitration control logic coupled to said plurality of processor cores, said arbitration control logic to receive thread progress information from said plurality of processor cores and to arbitrate priority to determine which threads should be assisted.

4. The multicore multithreaded processor of claim 1 wherein each processor core comprises:
a thread livelock unit coupled to said core to measure thread livelock indicators; and
a memory livelock unit coupled to said core to measure memory livelock indicators.

5. The multicore multithreaded processor of claim 4, further comprising:
an arbitrator to receive livelock information from the thread livelock unit and said memory livelock unit of each of said plurality of processor cores, said arbitrator to prioritize one thread over another in response to said livelock information.

* * * * *